United States Patent [19]

Grim et al.

[11] Patent Number: 4,868,762
[45] Date of Patent: Sep. 19, 1989

[54] AUTOMATIC DIGITAL DYNAMIC BALANCING MACHINE AND METHOD

[75] Inventors: Gary K. Grim, Dexter; Matthew Kimble, Pinckney, both of Mich.

[73] Assignee: Balance Technology, Inc., Ann Arbor, Mich.

[21] Appl. No.: 96,976

[22] Filed: Sep. 14, 1987

[51] Int. Cl.[4] .................. G01M 1/18; G01M 1/22
[52] U.S. Cl. ......................... 364/508; 73/462
[58] Field of Search ..................... 364/508; 73/462

[56] References Cited

U.S. PATENT DOCUMENTS

| 3,017,773 | 1/1962 | Lash et al. | 73/462 |
| 3,302,491 | 2/1967 | Bjorn . | |
| 3,774,456 | 11/1973 | Crump | 73/462 |
| 3,854,339 | 1/1974 | Muller | 73/462 |
| 4,046,017 | 9/1977 | Hill | 73/462 |
| 4,060,002 | 11/1977 | Mortensen | 73/462 |
| 4,201,091 | 5/1980 | Guyot et al. | 73/462 |
| 4,285,240 | 8/1981 | Gold | 73/462 |
| 4,419,894 | 12/1983 | Matumoto | 73/462 |
| 4,480,472 | 11/1984 | Wood | 73/462 |
| 4,741,210 | 5/1988 | Maus | 364/508 X |

FOREIGN PATENT DOCUMENTS

| 22526 | 2/1982 | Japan | 73/462 |
| 97545 | 5/1986 | Japan | 73/462 |

Primary Examiner—Eugene R. Laroche
Assistant Examiner—Benny Lee
Attorney, Agent, or Firm—Krass & Young

[57] ABSTRACT

The balancing machine of the present invention automatically determines the position of unbalance in a rotating part and stops the rotating part with the unbalance position in a predetermined location. Sensors on the bearings holding the rotating part generate signals proportional to the instantaneous unbalance. These signals are filtered and digitized at a sampling rate synchronous with the motor driving the rotation. Two contiguous sets of samples, each set spanning several revolutions of the part, are stored. The X and Y components of the unbalance signal are calculated for each sample set and the actual rotation rate of the part is calculated from the assumed rate and any difference in the phase angle of the unbalance location between the first and second sample sets. These calculations are performed during a calculation interval of predetermined length which follows the sampling. Once this calculation interval has passed and the unbalance location has rotated to the predetermined location a predetermined deceleration of the rotating part is begun. The motor is controlled to decelerate at a predetermined rate.

19 Claims, 4 Drawing Sheets

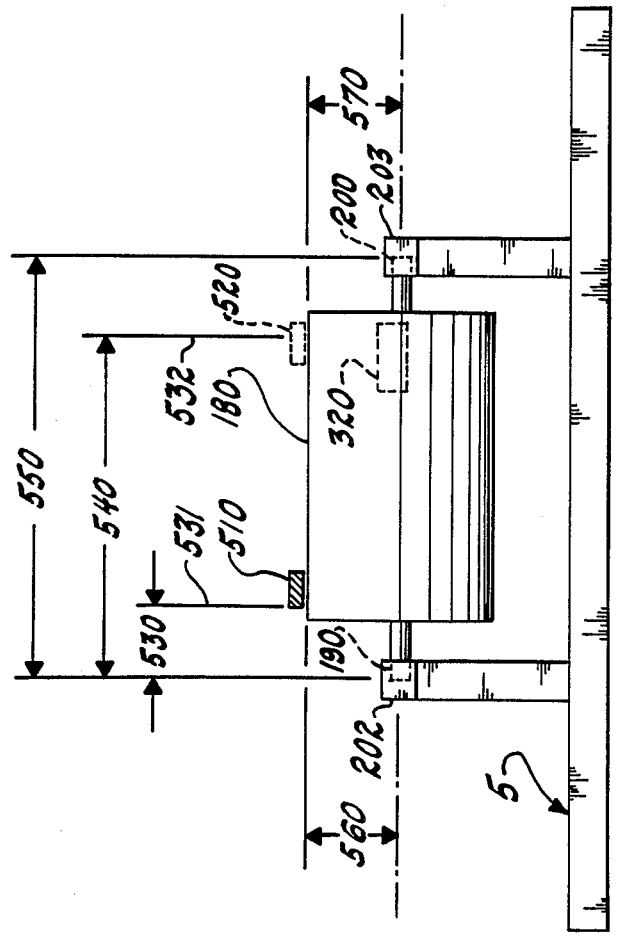

AUTOMATIC DIGITAL DYNAMIC BALANCING MACHINE AND METHOD

FIELD OF THE INVENTION

The present invention generally relates to a dynamic balancing machine, and, more particularly, to an automatic digital dynamic balancing machine wherein the amount and angular location of unbalance in a rotating part is calculated off line and the part is stopped with the unbalance in a predetermined position without using a reference marking on the rotating part.

BACKGROUND OF THE INVENTION

In the dynamic balancing of a rotating part such as an electric motor armature, the part is mounted on its axis between bearings, rotated, and the unbalance is sensed by vibration or force sensors at the bearing locations. Several methods and devices have been developed to indicate the location of the unbalance on a rotated part. Two early types of machines widely used in industry use stroboscopic and photocell techniques to locate the unbalance. These both had the disadvantage of requiring physical markings on the part being rotated. These machines also required visual estimates of the unbalance location and were therefore subject to operator error.

The most advanced machine of this type is disclosed in U.S. Pat. No. 4,419,894 to Matumoto, wherein an unmarked workpiece is rotated, the unbalance measured and located, and the workpiece stopped with the unbalance position in a predetermined orientation for subsequent marking and material mass addition or removal. This machine utilizes vibration sensors to generate an analog unbalance signal which is sinusoidal. An unbalance phase pulse is then electronically generated once per cycle at the positive going zerocrossing of the unbalance signal. The workpiece is driven by a stepper motor. Each drive pulse supplied to the stepper motor causes the workpiece to rotate an unknown but fixed angle. A counter, preset with a number representing an integral number of stepper motor drive pulses, is counted back upon each stepper motor drive pulse, starting with the receipt of an unbalance phase pulse and the rotated workpiece is stopped when the counter reaches zero. It is a real time system in that pulses coming from the unbalance sensor are used to initiate the countdown.

There are several limitations and drawbacks associated with this type of machine. First, considerable time is required to initially set up the machine to maximize plane separation, select optimum counter settings, and set acceleration and deceleration rates to minimize belt slippage. These adjustments must be made for each different workpiece type measured. Settings are determined by trial and error methods which are awkward and time consuming.

Second, the Matumoto method does not verify the accuracy of the determination of the rotational speed and therefore introduces error due to inherent drive belt slippage between the stepper motor drive and the driven part.

Third, minor differences in armature diameters may introduce errors in unbalance positioning because the Matumoto machine does not measure and utilize the actual rotational frequency of the workpiece.

Finally, because the Matumoto method involves time consuming setup steps and inherent errors for each workpiece, it entails significant restrictions in efficiency for production line processing.

SUMMARY OF THE INVENTION

The present invention provides an automatic balancing machine and method that overcomes the above identified drawbacks and disadvantages. It is an object of this invention to provide a dynamic balancing machine and a digital method for automatically determining the amount and angular location of unbalance in a rotating part and stopping the part with the unbalance accurately positioned in a predetermined orientation for marking and correction.

It is a further object of this invention to provide an automatic balancing method wherein the angular velocity of the rotating part is accurately measured and a correction made to the assumed angular velocity to accurately calculate the time to decelerate and position the unbalance in a predetermined orientation.

It is a further object of this invention to provide an automatic digital balancing machine that digitally calculates the unbalance phase angle off line by use of a microprocessor and displays the unbalance of each correction plane visually using conventional video technology.

Accordingly the present invention provides a machine and method for automatically determining the location and amount of unbalance of a rotated part accurately and efficiently. The invention involves a unique combination of steps to determine the unbalance location and magnitude. The method comprises the following operative steps:

(a) rotating a part to be balanced between two axially opposed bearings;

(b) generating an electrical signal proportional to the rotary unbalanced at one of the bearings;

(c) calculating the actual angular velocity from the unbalanced signal and a predetermined assumed angular velocity;

(d) calculating the time at which to begin the acceleration of the part at a predetermined deceleration rate in order to stop the part with the unbalanced location in a predetermined position; and (e) decelerating the part at the predetermined rate at the proper time.

An illustrative and specific embodiment of the method invention comprises the following steps:

(a) rotating the part between stationary bearings, (b) generating an analog electrical unbalance signal proportional to the forces generated by the rotating part at the bearing locations, (c) generating time interval signals synchronous with the rotation, (d) converting the analog unbalance signal to a digital signal, (e) measuring and storing a first digital signal sample during a first set of predetermined repetitive time intervals, (f) measuring and storing a second digital sample during a second like set of time intervals contiguous with the first, (g) calculating the average demodulated phase angles for the first and second sets of samples according to the following equations:

$$A_x = \sum_{i=0}^{M-1} \sum_{j=1}^{N} \left[ S_{(iM+j)} * \sin\left(\frac{2\pi j}{N}\right) \right]$$

$$A_y = \sum_{i=0}^{M-1} \sum_{j=1}^{N} \left[ S_{(iM+j)} * \cos\left(\frac{2\pi j}{w} N\right) \right]$$

where $A_x$ and $A_y$ are the demodulated coordinate components of the average unbalance signal from a set of samples "A"

N = number of discrete sample elements per revolution
M = number of revolutions per sample set
S = sample element of the electrical unbalance signal sample (h) calculating the actual angular velocity R according to the following equation:

$$R = \frac{M + (B - A)/2\pi}{T}$$

where

M = the number of revolutions between the center of a first sample set to the center of a second sample set at the assumed angular velocity
B = the unbalance angle of the second sample set in radians
A = the unbalance angle of the first sample set in radians
T = the total length of time between the center of the first sample set to the center of the second sample set (i) calculating the number of time intervals corresponding to the unbalance phase angle at the actual angular velocity, (j) calculating the deceleration time period required to bring the part to rest in a predetermined integral number of revolutions, (k) establishing an initial reference point in time corresponding to some point during the measuring intervals, (l) triggering the deceleration of the rotating part when the elapsed time intervals from the initial reference point equals the sum of the calculated time intervals corresponding to the unbalance phase angle plus a predetermined calculation time interval from the initial point.

The preferred embodiment of balancing machine includes a frame, axially opposed bearing for rotatably supporting the part to be balanced, at least one force detector for detecting the forces normal to the axis of part rotation, circuit for producing an electrical unbalance signal, clock for generating an indication of repetitive time intervals, sampling device for measuring sets of discrete sequential sample elements, memory for storing the sample sets, device connected to the drive motor for controlling the drive motor synchronous with the sampling device, a microprocessor device for calculating the demodulated average unbalance components of each of two contiguous sample sets, calculating the difference value between the two sets of average unbalance, calculating the actual angular velocity from the difference value, controlling the deceleration of the drive motor at a constant rate unit the part is stationary, and calculating the time to decelerate the part and stop the part with the unbalance in a predetermined position.

BRIEF DESCRIPTION OF THE DRAWINGS

FIG. 5 is a partial front view of the two plane hard bearing balancer shown in FIG. 1.

DETAILED DESCRIPTION OF THE PREFERRED EMBODIMENT

Figure 1:
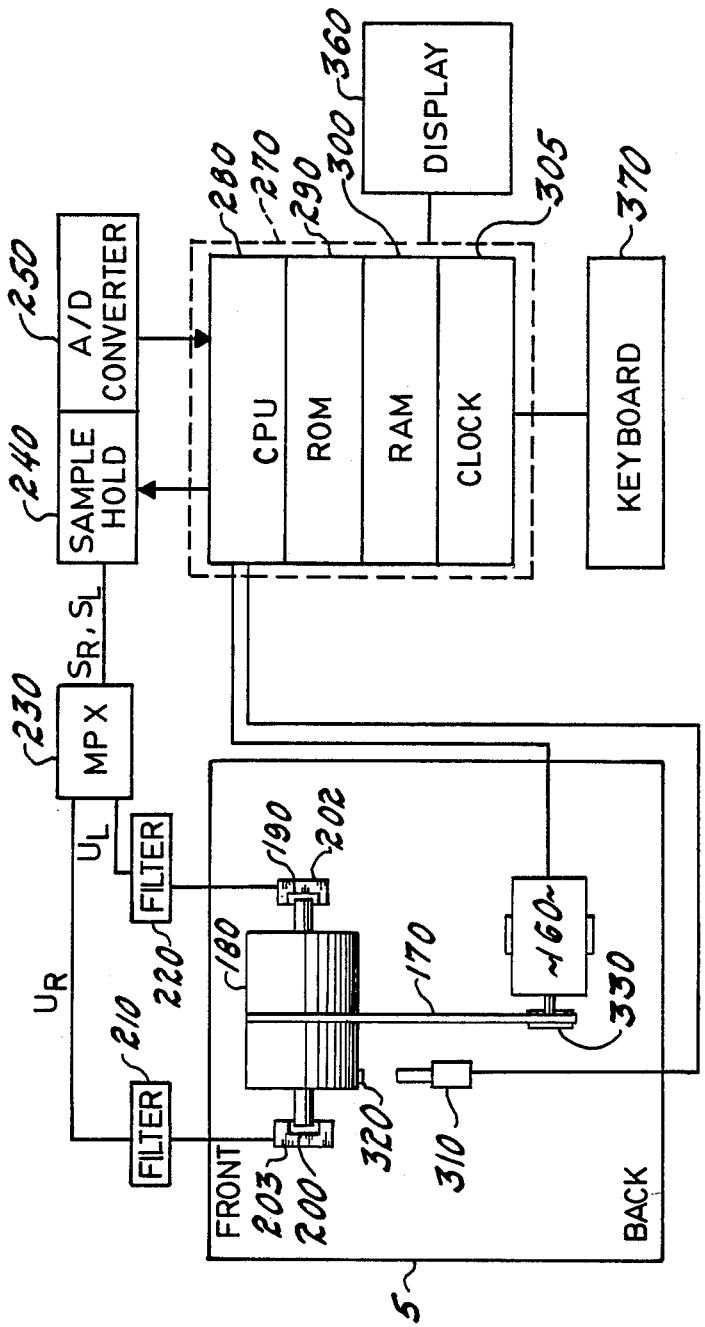
FIG. 1 is a block diagram of a two plane hard bearing balancer.

Referring now to the drawings, and more particularly to FIG. 1 there is shown an elementary block diagram of the automatic digital balancing machine and microprocessor components. The workpiece part 180 to be balanced is mounted between hard bearings 190 and 200. A DC stepper motor 160 is connected to the part via belt 170. There are several belt orientations that may be used.

Figure 2:
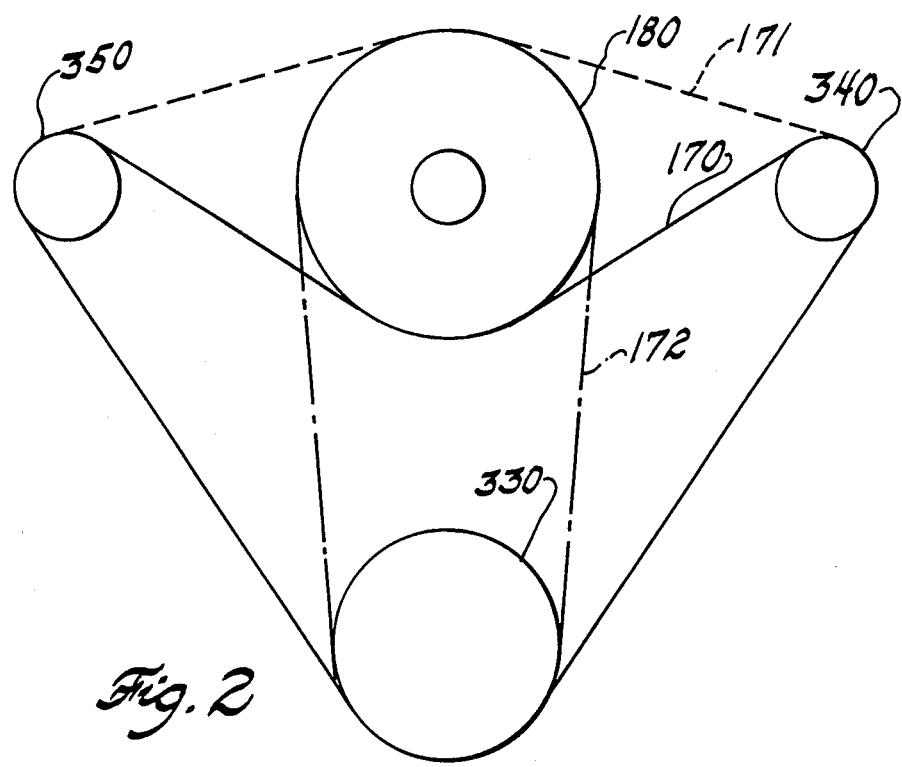
FIG. 2 is a sectional view of the balancer illustrating the different drive belt arrangements between the stepper motor and the driven part.

Referring now to FIG. 2, there is shown three alternate belt arrangements. The DC stepper motor sheave 330 is connected around idler pulleys 340 and 350 in two orientations of the driven part 180. The belt 170 routed underneath part 180 and over idler pulleys 340 and 350 is a preferred arrangement for small, light parts where production run speed is more important than minimizing signal noise. Belt 171 routed over part 180 and idlers 340 and 350 is an alternate but not preferred arrangement. The belt 172 routed between the stepper motor and the part directly is used where minimizing noise is critical.

Figure 3:
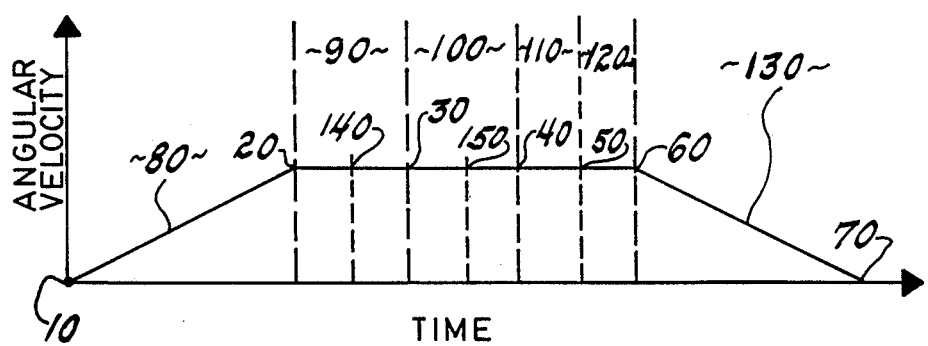
FIG. 3 is a graph of angular velocity versus time for a rotating workpiece illustrating the major events during a measuring cycle.

FIG. 3 illustrates curve 1 of a typical measurement sequence. Curve 1 shows an increasing part angular velocity until full operating speed is reached at which time the speed becomes and remains constant until deceleration begins. During region 80 the part is accelerated at a constant value from rest at point 10 to the operating speed at point 20. At point 20 the acceleration becomes zero and the part rotates at a constant angular velocity during regions 90, 100, 110, and 120. At point 60 deceleration begins at a constant rate in region 130 until the part is stopped at point 70. Acceleration and deceleration in regions 80 and 130 need not be the same rates. The critical rate is in region 130 where deceleration must be slow enough that no slippage occurs between the drive stepper motor, the part, and the drive belt due to inertial forces and must occur in an integral number of revolutions. A first sample set begins at point 20 and is completed at point 30 which is also the beginning of the second sample set. The second sample set ends at point 40. Each sample set 90 and 100 optimally correspond to 16 revolutions of 32 samples per revolution for a total of 512 samples in each set of data. Points 140 and 150 represent the center of the first and second sampling intervals respectively.

Returning now to FIG. 1, the DC stepper motor 160 and bearings 190 and 200 are rigidly mounted to the machine frame 5. Piezoelectric transducers 202 and 203 are utilized to generate electrical signals proportional to the forces applied to them. When the part 180 is rotated, these forces are normal to the axis of rotation and represent the unbalance present in the rotating part. The signal generated by piezoelectric transducers 202 and 203 also contain unwanted signals. The unwanted signals at or above the sampling rate are eliminated by antialiasing filters 210 and 220. These unbalance signals ($U_L$, $U_R$) are then sent to multiplexer 230 where a choice of either $S_L$ or $S_R$ is made for further processing.

Plane separation is required because the signal from the transducer 202 will have part of its magnitude due to the influence of the forces at transducer 203 and vice versa. During calibration the vector constants ($K_1$, $K_2$, $K_3$, $K_4$) are determined in the following set of equations:

$$U_L = K_1 * S_L + K_2 * S_R$$

$$U_R = K_3 * S_L + K_4 * S_R$$

where
 $S_L$ is the separate left channel signal,
 $S_R$ is the separate right channel signal,
 $U_L$ is the composite left channel signal, and
 $U_R$ is the composite right channel signal.

By utilizing known unbalance masses, positions, and the frequency of rotation, constants $K_1$, $K_2$, $K_3$, and $K_4$ can be determined and entered into random access memory 300 automatically by the microprocessor 270. Microprocessor 270 is then enabled to perform the required plane separation.

Referring now to FIG. 5, which is a partial frontview of the rated part mounting configuration, the following physical parameters are required to be input and stored in the microprocessor 270 RAM 300 via keyboard 370 (FIG. 1) prior to measuring or calibration of any rotated part:

(a) Left plane 531 location 530, measured from the bearing 190 along the rotational axis;

(b) Left correction radius 560, measured from the rotational axis radially to the surface of the part at the location of the left plane 531;

(c) Right plane 532 location 540, measured from the bearing 190 along the rotational axis; and (d) Right correction radius 570, measured from the rotational axis radially to the surface of the part in the location of the right plane 532. Note that FIG. 5 illustrates the length 550 of rotating part 180 from bearing 190 to bearing 200.

Referring back to FIG. 1, in order to determine the constants $K_1$, $K_2$, $K_3$, and $K_4$ for a class of rotated parts, a three spin calibration procedure is followed to generate three sets of known unbalance signals which the microprocessor 270 then uses to mathematically determine the constant values. This procedure requires the use of a photoreflector sensor 310 and a reflective target 320 (see FIG. 1) temporarily affixed to a rotating part 180 which is an example of the desired type of rotating parts.

Referring back to FIG. 5, the reflective target is shown behind the rotated part 180. In FIG. 5 is also shown a calibration weight 510 placed at the left plane 531. This is the position of the weight during the first calibration spin. The part is then stopped and the calibration weight moved to the right plane 532 (shown in phantom at 520) for the second spin. The third spin is done with the calibration weight removed. Prior to the first spin, however, the following information must be input to the microprocessor 270 via the keyboard 370:

(a) Calibration weight;

(b) Radius 560 at left plane 531 measured from the rotational axis to the surface of the rotated part 180;

(c) Angle between target 320 and left calibration weight location 510;

(d) Radius 570 at right plane 532 measured from the rotational axis to the surface of the rotated part 180;

(e) Angle between target 320 and right calibration weight location 520; and (f) Photo pickup (310) angle measured from the back of the base unit (5) counterclockwise when viewed from the right side.

The three spins provide known values of unbalance from which the microprocessor circuitry determines the values of $K_1$, $K_2$, $K_3$, and $K_4$ used to correct the actual unbalance signals at the chosen left and right unbalance planes, $U_L$ and $U_R$ respectively to give the true unbalance signals $S_L$ and $S_R$.

Referring again to FIG. 1, during a spin of the part 180, corrected signals $S_R$ or $S_L$ enter the sample hold circuit 240 from the multiplexer 230. The microprocessor 270 also feeds timing pulses to the sample hold circuit to establish the sample increments.

Once the rotating part 180 reaches operating speed the two set sampling begins. Each sample element for each sample increment is then converted to a digital equivalent signal by the analog/digital converter 250. Each digital signal element is then stored by the microprocessor in random access memory 300 to await further processing. Each sample set of 512 elements is stored in random access memory 300 in 512 separate locations corresponding to the signal's time interval.

The central processing unit 280 marks the time corresponding to an arbitrary point such as the last sample increment in the sample time sequence as an initial point. The clock 305, through the central processing unit 280, also provides the timing pulses to the DC stepper motor such that the position of the DC stepper 160 motor relative to the initial point is currently known by the central processing unit 280.

When two contiguous sets of samples $S_A$ and $S_B$ have been stored by the microprocessor 270, the phase angle relative to the arbitrary reference can be determined. The central processing unit 270 accesses read only memory 290 wherein a 512 element table of sine and cosine functions are stored. These tables are then employed with the stored sample data to calculate the average demodulated components of the phase angle with respect to a predetermined desired position. The sine and cosine table values are employed with the stored sample elements by microprocessor 270 to generate the demodulated phase angle coordinates $A_x$ and $A_y$ per the following equations:

$$A_x = \sum_{i=0}^{M-1} \sum_{j=1}^{N} \left[ S_{(iM+j)} * \sin\left(\frac{2\pi j}{N}\right) \right]$$

$$A_y = \sum_{i=0}^{M-1} \sum_{j=1}^{N} \left[ S_{(iM+j)} * \cos\left(\frac{2\pi j}{w} N\right) \right]$$

where
 M = number of revolutions per sample set
 N = number of sample elements per revolution
 S = signal at time increment iM+j The sine and cosine tables are then employed by microprocessor 270 to the second set of samples to determine the demodulated phase angle coordinates $B_x$ and $B_y$ per the same equations.

A correction is then made for any error in the assumed speed of the rotated part. The assumed speed is manually entered via keyboard 370 prior to balancing and is based on the arrangement and relative diameters of the drive pulley 330, the rotated part diameter and the stepper motor rate. In the embodiment of FIG. 1, microprocessor 270 provides pulses to a stepper motor 160 at a rate which is controlled by clock 305. This stepper rate is set synchronous with the sample hold circuit 240, which is also set by microprocessor 270. Should there be an difference between the calculated average phase angles of sample sets A and B, this indicates that the actual speed is not synchronous with the assumed speed. Microprocessor 270 makes correction by calculating the actual angular velocity R according to the following equation:

$$R = \frac{M + (B - A)/2\pi}{T}$$

where

M = the number of revolutions between the center of a first sample set to the center of a second sample set at the assumed angular velocity B = the unbalance angle of the second sample set in radians A = the unbalance angle of the first sample set in radians T = the total length of time between the center of the first sample set to the center of the second sample set Referring now to FIG. 3, points 140 and 150 correspond to the midpoints of sample period 90 corresponding to sample A and sample period 100 corresponding to sample B, respectively. Because the sample periods 90 and 100 are the same length, the time increment between points 140 and 150 is this same length. Therefore the equation above yields the corrected or actual rotational velocity. The inverse of this equation provides the number of time increments per revolution of the part. Period 110 shown between points 40 and 50 is an arbitrary assumed time period to compensate for the off line computational time required by microprocessor 270 to calculate actual frequencies and is on the order of 500 milliseconds. One skilled in the art would appreciate that this time must be set with reference to the speed of operation of microprocessor 270. The period 120 between points 50 and 60 represents the time required to position the rotating part with the unbalance located at the desired final position such that at point 60 the unbalance location will be a predetermined integral number of revolutions from the stop position and the deceleration may begin. Deceleration is preprogrammed into the microprocessor 270 as a constant rate. Microprocessor 270 is programmed to generate pulses for driving stepper motor 160 for deceleration in accordance with this constant deceleration rate.

Calculation of the time to point 60 is performed by calculating the total amount of time between the initial point and the point 60. The initial point may be any point in the measuring cycle at to or after point 20. Typically point 40 is used. Therefore the time to reach point 60 may be calculated by adding the predetermined delay period 110 to the calculated phase angle 120. When the elapsed time equals the calculated time to point 60 the deceleration ramp is begun.

Microprocessor 270 is further connected to display 360. In conjunction with the calculation of the place of imbalance and controlling the deceleration of stepper motor 160 to stop the unbalance at the predetermined position, microprocessor 260 also generates signals for display via display 360. As is conventional in such microprocessor control systems, display 360 is employed to display user prompts for initial set up, as for example requesting entry of the desired speed of rotation of the rotating part, information on the status of dynamic balancing operation and so forth. In addition microprocessor 270 computes the magnitude of the unbalance in the rotating part. Display 360 is employed to display this quantity together with the calculated actual rotational speed and the location of the imbalance after completion of the dynamic balancing operation. Display 360 could be formed of light emitting diodes, a liquid crystal display, however the preferred embodiment is a video display monitor formed with a cathode ray tube.

Figure 4:
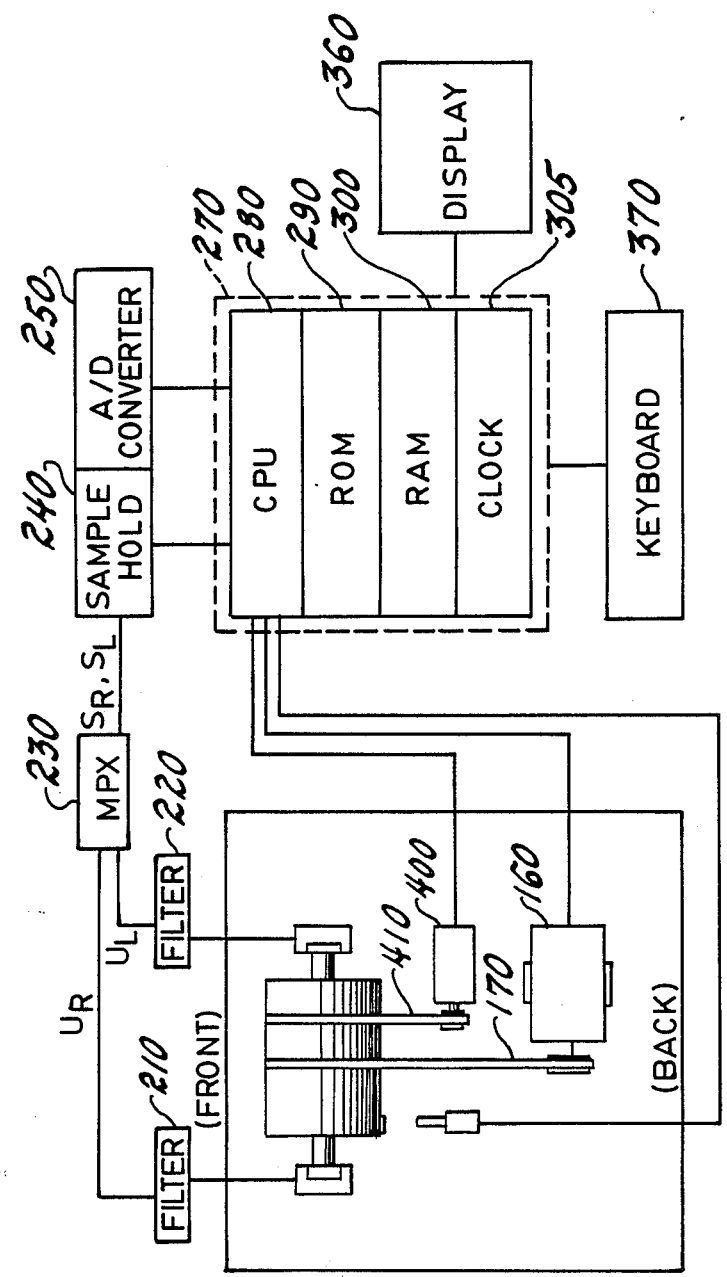
FIG. 4 is a block diagram of a two plane hard bearing balancer utilizing an encoder to generate timing intervals.

In the embodiment illustrated in FIG. 1, the stepper motor rate was controlled in relation to an independently set sampling rate. FIG. 4 illustrates an alternative embodiment. Microprocessor 270 controls the speed of operation of stepper motor 160 by generation of pulses with the appropriate timing. This timing of pulses takes place in relation to the signals from clock 305. A shaft encoder 400 is coupled to the rotating part by belt 410. Rotation of the rotating part causes belt 410 to rotate shaft encoder 400. Shaft encoder 400 in turn generated a signal which indicates the rotary position of shaft encoder 400. Microprocessor 270 employs this signal from shaft encoder 400 to generate the sampling rate signal for sample hold circuit 240. The sample rate is thus asynchronous with the stepper motor rate. In other regards, the apparatus illustrated in FIG. 4 operates in the same manner as previously described.

We claim:

1. A balancing machine for automatically determining the unbalance location of a rotating part and automatically stopping said part with the unbalance location in a predetermined position, comprising:

a stationary frame;

bearing means for rotatably supporting the rotating part to be balance on said stationary frame;

drive motor means for rotating the rotating part;

transducer means disposed at said bearing means for sensing the rotary unbalance of the rotating part and for producing an electrical unbalance signal proportional to the rotary unbalance;

speed control means connected to said drive motor means for controlling the nominal speed of rotation of the rotating part by said drive motor;

speed calculation means connected to said transducer means for calculating the actual speed of rotation of the rotating part from said electrical unbalance signal;

deceleration time calculation means connected to said transducer means and said speed calculation means for calculating the time to being to decelerate said rotating part at a predetermined deceleration rate to stop the rotating part with the unbalance location in a predetermined position, said deceleration time calculation means determining the deceleration time from said electrical unbalance signal and said calculated actual speed of rotation; and deceleration means connected to said deceleration time calculation means and said speed control means for decelerating said drive motor means at said predetermined deceleration rate starting at said time calculated to begin to decelerate the rotating part.

2. The balancing machine as claimed in claim 1, wherein said transducer means includes a piezoelectric crystal disposed at said bearing means and responsive to the rotary unbalance of the rotating part for producing an electrical signal, an antialiasing filter having an input receiving said electrical signal of said piezoelectric crystal and having an output, and an analog to digital converter having an analog input connected to said output of said antialiasing filter and a digital output for producing said electrical unbalance signal.

3. The balancing machine as claimed in claim 1 wherein the drive motor means is a DC stepper motor.

4. The balancing machine as claimed in claim 1, further comprising:
a microprocessor device including a central processing unit, a read only memory, a random access memory and a clock, having a program stored in said read only memory for controlling said microprocessor device to embody said speed control means, said speed calculation means and said deceleration time calculation means.

5. The balancing machine as claimed in claim 4, wherein said deceleration means consists of a predetermined drive function for producing a linearly varying speed having said predetermined deceleration rate.

6. The balancing machine as claimed in claim 5, wherein said predetermined drive function spans an integral number of revolutions of the rotating part.

7. The balancing machine as claimed in claim 4, further comprising:
a visual display means connected to said microprocessor device for displaying the actual speed of rotation of the part, the amount of unbalance, and the location of the unbalance.

8. The balancing machine as claimed in claim 7, wherein said visual display means comprises a video monitor.

9. The balancing machine as claimed in claim 1, further comprising:
sampling means connected to said transducer means for sampling at least two separate sets of discrete sequential sample elements of said electrical unbalance signal at a predetermined sampling rate;
memory means connected to said sampling means for storing said at least two sets of discrete sequential sample elements of said electrical unbalance signal;
demodulated average unbalance component calculation means connected to said memory means for recalling said discrete sequential sample elements and calculating the demodulated average unbalance component of each stored set of discrete sequential sample elements of said electrical unbalance signal for the respective perpendicular components of an arbitrary reference system at an assumed speed corresponding to said nominal speed of said speed control means;
difference angle calculation means connected to said demodulated average unbalance component calculation means for calculating the difference angle between said demodulated average unbalance component of discrete sequential sample elements of said electrical unbalance signal relative to respective perpendicular components of an arbitrary reference system for said at least two sets of discrete sequential sample elements; and
wherein said speed calculation means is connected to said difference angle calculation means and calculates said actual speed employing said difference angle; and
wherein said deceleration time calculation means is connected to said demodulated average unbalance component calculation means and calculates said time to begin to decelerate said rotating part employing said calculated demodulated unbalance signal corrected for said calculated actual speed.

10. The balancing machine as claimed in claim 9, wherein:
said speed calculation means calculates according to the equation $$R = \frac{M + (B - A)/2\pi}{T}$$

where
R = the actual speed of rotation of the rotating part,
M = the assumed number of revolutions of the rotating part between the center of a first sample set and the center of a second sample set at said nominal speed,
A = the unbalance angle of a first sample set in radians,
B = the unbalance angle of a second sample set in radians, and
T = the total length of time between the center of a first sample set and the center of a second sample set at said nominal speed.

11. The balancing machine as claimed in claim 9, wherein each sample set of discrete sequential increments consists of five hundred twelve increments spanning sixteen revolutions of said rotated part.

12. The balancing machine as claimed in claim 9, further comprising:
a shaft rotation encoder coupled to be driven by the rotating part for generating an electrical signal indicative of the speed of rotation of the rotating part; and
said sampling means being connected to said shaft encoder whereby said sampling rate is set in synchronism with said electrical signal indicative of the speed of rotation of the rotating part.

13. The balancing machine as claimed in claim 9, wherein:
said demodulated average unbalance component calculation means calculates the demodulated average unbalance components of each of said stored sample sets according to the equations $$A_x = \sum_{i=0}^{M-1} \sum_{j=1}^{N} \left[ S_{(iM+j)} * \sin\left(\frac{2\pi j}{N}\right) \right]$$

$$A_y = \sum_{i=0}^{M-1} \sum_{j=1}^{N} \left[ S_{(iM+j)} * \cos\left(\frac{2\pi j}{w} N\right) \right]$$

where
$A_x$ and $A_y$ are respective X and Y demodulated coordinate components of the average unbalance signal calculated from a corresponding set of samples,
N = the number of discrete samples per revolution of the part at said nominal speed, M = the number of revolutions of the part per sample set at said nominal speed, and $S_{(iM+j)}$ = the jth sample of said sample elements of said electrical unbalance signal of the ith revolution of the part of said corresponding set of sample elements.

14. A method for automatically determining the unbalance location in a rotating part and positioning said part with the unbalance location in a predetermined position, comprising the steps of:

rotating a part to be balanced between two axially opposed bearings at a predetermined assumed angular velocity;

sensing the rotary unbalance of the rotating part at at least one of said axially opposed bearings;

generating an electrical unbalance signal proportional to the sensed rotary unbalance;

calculating the actual angular velocity of the rotating part from said unbalance signal and said predetermined assumed angular velocity;

calculating the time to begin to decelerate the rotating part at a predetermined rate to stop the rotating part with the unbalance location in a predetermined position from said electrical unbalance signal and said calculated actual angular velocity; and decelerating the rotating part at said predetermined rate when the time reaches said calculated time to begin to decelerate the rotating part.

15. The method as claimed in claim 14, further comprising the steps of:

sampling first and second separate sets of discrete sequential sample elements of said electrical unbalance signal at repetitive time intervals at a predetermined sampling rate;

storing in a memory said first and second sets of discrete sequential sample elements of said electrical unbalance signal;

recalling said first set of sample elements from said memory;

calculating the demodulated average of the electrical unbalance signal for said first set of sample elements relative to respective perpendicular components of an arbitrary reference system at said predetermined assumed angular velocity from said recalled first set of sample elements;

recalling said second set of sample elements from said memory;

calculating the demodulated average of the electrical unbalance signal for said second set of discrete sequential sample elements relative to respective perpendicular components of said arbitrary reference system at said predetermined assumed angular velocity from said recalled second set of sample elements;

calculating the difference angle between the demodulated average unbalance signal for the respective perpendicular components of said arbitrary reference system for said first and second sets of sample elements;

said step of calculating the actual angular velocity of the rotating part employing said calculated difference angle between the demodulated average unbalance signal for the respective perpendicular components of said arbitrary reference system for said first and second sets of sample elements; and said step of calculating the time to begin to decelerate the rotating part employing said calculated demodulated average of the electrical unbalance signal of one of said first and second sets of sample elements corrected for said calculated actual angular velocity.

16. The method as claimed in claim 15, wherein the actual angular velocity is calculated according to the equation $$R = \frac{M + (B - A)/2\pi}{T}$$

where

M = the assumed number of revolutions between the center of a first sample set and the center of a second sample set at said predetermined assumed angular velocity, A = calculated unbalance phase angle of said first sample set in radians, B = calculated unbalance phase angle of said second sample set in radians, and T = the total length of time between the center of a first sample set and the center of a second sample set at said predetermined assumed angular velocity.

17. The method as claimed in claim 15 wherein the first and second sets each contain five hundred twelve repetitive time intervals.

18. The method as claimed in claim 15, wherein said storage step and said calculation steps are performed by a microprocessor.

19. The method as claimed in claim 15, wherein the average demodulated components for said first and second sets are calculated according to the equations $$A_x = \sum_{i=0}^{M-1} \sum_{j=1}^{N} \left[ S_{(iM+j)} * \sin\left(\frac{2\pi j}{N}\right) \right]$$

$$A_y = \sum_{i=0}^{M-1} \sum_{j=1}^{N} \left[ S_{(iM+j)} * \cos\left(\frac{2\pi j}{w} N\right) \right]$$

where $A_x$ and $A_y$ are respective X and Y demodulated coordinate components of the average unbalance signal calculated from a set of samples, N = the number of discrete samples per revolution of the part at said predetermined assumed angular velocity, M = the number of revolutions of the part per sample set at said predetermined assumed angular velocity, and $S_{(iM+J)}$ = the length of sample of said sample elements of said electrical unbalance signal of the ith revolution of the part of said corresponding set of sample elements.

* * * * *

UNITED STATES PATENT AND TRADEMARK OFFICE
CERTIFICATE OF CORRECTION

PATENT NO. : 4,868,762

DATED : Sep. 19, 1989

INVENTOR(S) : Grim et al.

It is certified that error appears in the above-identified patent and that said Letters Patent is hereby corrected as shown below:

Column 3, line 66, "unit" should be --until--.

Column 8, line 43, "balance" should be --balanced--.

Column 8, line 58, "being" should be --begin--.

Column 12, line 58, "length of" should be --jth--.

Signed and Sealed this

Sixteenth Day of October, 1990

*Attest:*

HARRY F. MANBECK, JR.

*Attesting Officer*     *Commissioner of Patents and Trademarks*